United States Patent [19]
Baichtal

[11] 3,829,893
[45] Aug. 13, 1974

[54] TAPE SPEED MONITOR

[75] Inventor: James R. Baichtal, Los Altos, Calif.

[73] Assignee: Vidar Corporation, Mountain View, Calif.

[22] Filed: May 29, 1973

[21] Appl. No.: 365,029

[52] U.S. Cl. .................... 360/73, 324/161, 324/179
[51] Int. Cl. .......................................... G11b 15/22
[58] Field of Search...... 324/161, 179; 179/100.2 B, 179/100.2 S; 340/174.1 A, 174.1 B

[56] References Cited

UNITED STATES PATENTS

| | | | |
|---|---|---|---|
| 2,989,690 | 6/1961 | Cook | 340/174.1 B |
| 3,147,462 | 9/1964 | Levinson et al. | 340/174.1 B |
| 3,320,600 | 5/1967 | Headrick et al. | 340/174.1 B |
| 3,412,385 | 11/1968 | Wang et al. | 340/174.1 B |
| 3,439,354 | 4/1969 | Behr et al. | 340/174.1 B |
| 3,575,658 | 5/1971 | Behr | 340/174.1 B |
| 3,587,071 | 6/1971 | Stegman | 340/174.1 B |
| 3,646,535 | 2/1972 | Behr | 340/174.1 B |
| 3,656,125 | 4/1972 | Kandz et al. | 340/174.1 B |
| 3,666,883 | 5/1972 | Yano et al. | 340/174.1 B |

*Primary Examiner*—Vincent P. Canney
*Attorney, Agent, or Firm*—Flehr, Hohbach, Test, Albritton & Herbert

[57] ABSTRACT

Disclosed is a tape speed monitor for monitoring the speed of magnetic tape in a magnetic tape storage unit and for providing an error signal whenever the tape speed is not within a predetermined range. The tape speed is measured by comparing the lapsed time between written data and the same data reread during the normal operation of a read-after-write tape unit. Two tape speed monitors are employed in combination within a redundant, highly reliable telephone local message metering system.

16 Claims, 3 Drawing Figures

TAPE SPEED MONITOR

CROSS REFERENCE TO RELATED APPLICATIONS

1. MESSAGE METERING SYSTEM, Ser. No. 295,656, filed Oct. 6, 1972, invented by John C. McDonald and Dalton W. Martin, and assigned to Vidar Corporation.
2. SCANNER BANK ADAPTER, Ser. No. 321,275, filed Jan. 5, 1973, invented by John C. McDonald and James R. Baichtal, and assigned to Vidar Corporation.
3. SCANNER BANK, Ser. No. 321,376, filed Jan. 5, 1973, invented by Gary C. Henrickson and John C. McDonald, and assigned to Vidar Corporation.
4. REDUNDANT DATA TRANSMISSION SYSTEM, Ser. No. 365,045, filed May 29, 1973, invented by James R. Baichtal and John C. McDonald, and assigned to Vidar Corporation.

BACKGROUND OF THE INVENTION

The present invention relates to the field of magnetic tape recording systems and particularly to tape speed monitors for monitoring tape speed during recording of information.

Monitors have been employed heretoforth to monitor indirectly the speed of magnetic tapes to insure reliable recording. Many such monitors, however, do not monitor tape speed directly but monitor through a mechanical coupling such as a capstan or other indirect coupling. Such indirect coupling is generally unsatisfactory for speed measurement associated with high reliability recording because of variations in mechanical tolerances and mechanical wear which may occur.

The need for an alarm whenever recording speed is outside a reliable range is particularly useful in telephone metering equipment. A need exists to provide a simple and accurate tape speed monitor which insures the accuracy of tape speed during normal recording and provides an alarm signal whenever the tape speed is outside a reliable range.

SUMMARY OF THE INVENTION

The present invention is a tape speed monitor for monitoring the speed of a magnetic tape in a magnetic tape storage unit and for providing an error signal whenever the tape speed is outside predetermined limits.

The tape speed monitor includes a source of timing pulses, a digital counter for counting the time pulses, a starting circuit for starting the counter when information is first written on the magnetic tape, and a stopping circuit for stopping the counter when the first written information is reread from the tape. The magnetic tape unit includes a write-head and a read-head in a read-after-write configuration. A first decoder is enabled when the read-head reads the first information written by the write-head. If the counter has not reached a predetermined minimum count when the first decoder is enabled, the decoder senses the fact and causes an alarm to be generated indicating that tape speed is too high. A second decoder decodes a maximum predetermined count, higher than the minimum count. If the counter reaches the maximum count, an alarm is generated indicating that tape speed is too slow.

In a further embodiment of the present invention, the tape speed monitor is arrayed in a redundant system in which two tape units exist and in which a control network is employed for selecting one of the two tape units for storing the desired information. If a tape speed alarm is sounded with respect to a data path including one tape unit, the other data path including the second tape unit is enabled for recording information provided it does not also have an alarm.

In accordance with the above summary of the invention, a simple and accurate tape speed monitor is provided which insures the accuracy of tape speed during the ordinary recording of information and provides an alarm signal whenever the tape speed is outside a desired range.

The foregoing and other objects, features and advantages of the invention will be apparent from the following more particular description of preferred embodiments of the invention, as illustrated in the accompanying drawings.

DETAILED DESCRIPTION

Figures 1, 2:
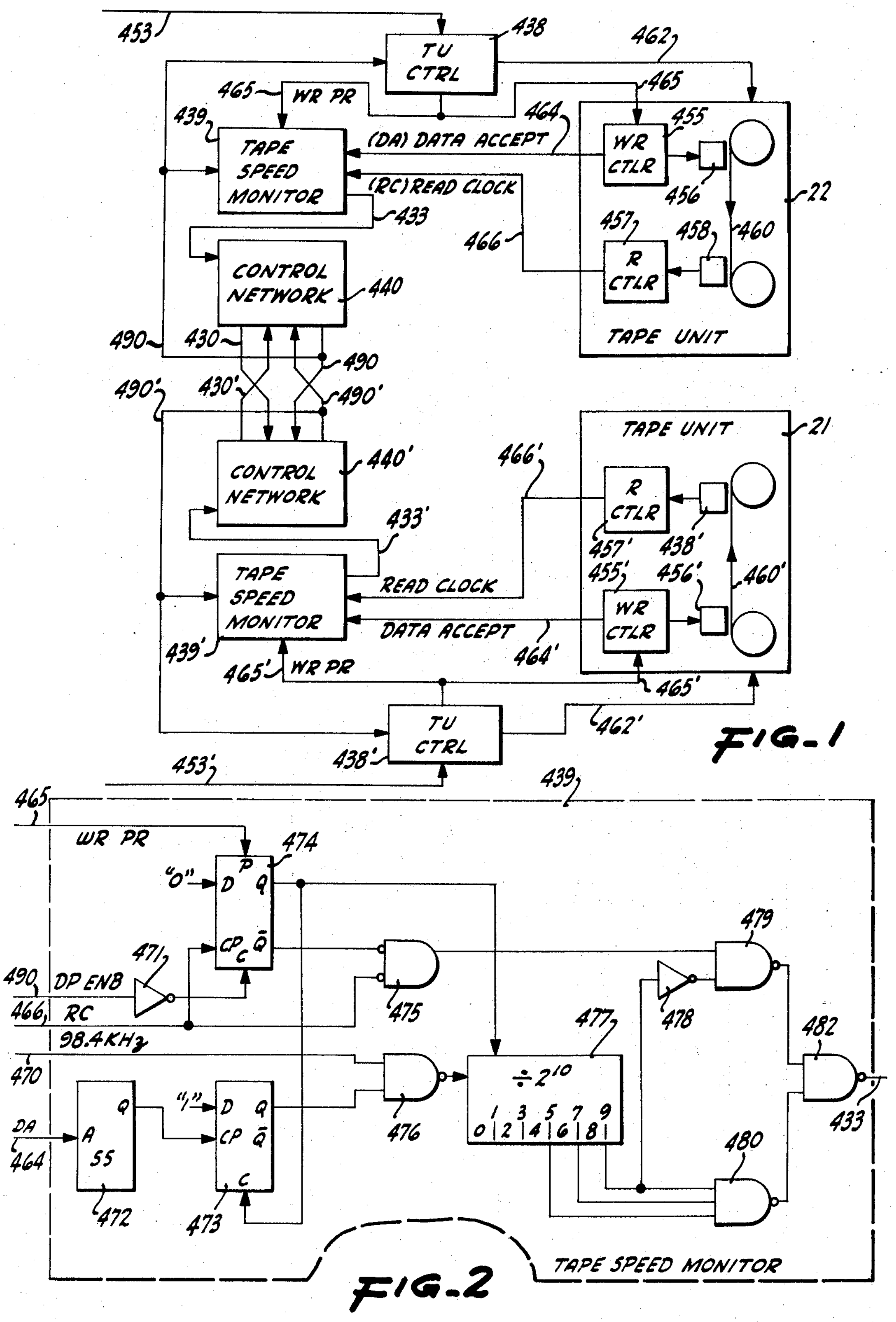
FIG. 1 depicts a block diagram representation of a system incorporating two redundant tape units and two tape speed monitors in accordance with the present invention.
FIG. 2 depicts a schematic representation of one tape speed monitor of the present invention and of the type employed in the redundant system of FIG. 1.

Overall Redundant System (FIG. 1)

In FIG. 1, two tape units are shown for storing information. The tape units 21 and 22 are, in one embodiment of the invention, associated with a metering system where the reliability of the information recorded is important. In order to insure that the recording is being satisfactorily made, the tape speed monitor 439 functions to monitor the speed of the magnetic tape in tape unit 22. The tape speed monitor 439' functions to monitor the speed of the tape in tape unit 21. If tape speed monitor 439 detects an improper tape speed, it provides an alarm signal on the line 433 which is input to a control network 440. The control network 440 causes the data path which includes tape unit 22 to be inactive and provides an input to the control network 440'.

Under proper conditions, control network 440' senses the inactive state caused by the control network 440 and enables the data path which includes tape unit 21. When operating, tape unit 21 has its tape speed monitored by tape speed monitor 439'. If the tape speed in unit 21 is outside acceptable limits, an alarm is generated on line 433' which is input to the control network 440'. Control network 440' then causes the data path including tape unit 21 to be inactive. If the data path including tape unit 22 is, at that time, free of alarm, control network 440 will enable the data path which includes tape unit 22.

The full details of a message metering system which employs redundant data paths and includes two tape units is described in the above-identified application entitled MESSAGE METERING SYSTEM and in the applications cross-referenced in that application. Additionally, the details of interlocking control networks 440 and 440' of FIG. 1, are claimed and described in the above-identified application entitled REDUNDANT DATA TRANSMISSION SYSTEM. The details of those above-identified applications are hereby incorporated by reference in this application for the purpose of teaching the general operation of a message metering system and specifically the operation of redundant data paths interconnected by control networks.

Still referring to FIG. 1, tape units 21 and 22 are standard devices and are preferably the tape units marketed by Hewlett Packard Corporation under model number 7970E. The tape units include a tape transport system for transporting magnetic tape 460 past write-head 456 and thereafter past read-head 458. The write-head receives write signals for writing information on the magnetic tape 460 from a write control 455. Specifically in the 7970E tape system, the write control 455 includes a WRITE FORMATER which receives a WRITE PREAMBLE signal (WR PR) on line 465 in response to and some time after the DATA AVAIL signal on line 453. The write preamble signal on line 465 causes the write control 455 to write 41 bytes of information on magnetic tape 460. Thereafter, the first byte of data is written. The control 455 issues a DATA ACCEPT signal (DA) on line 464 at the instant that that first byte of data is written. Prior to the write preamble signal on line 465 and in response to the data available signal on line 453, the tape transport system is energized by a signal on line 462 which starts the magnetic tape moving and allows it to achieve proper speed. The tape unit control 438 also issues the WRITE PREAMBLE signal (WR PR) on line 465 also to the tape speed monitor 439 for signaling the monitor 439 that a write data operation will be commenced shortly. The data available signals on lines 453 and 453' are preferably generated in the above-identified application MESSAGE METERING SYSTEM whenever the buffer 162 (not shown, see FIG. 7 therein) is filled with data or is otherwise ready to transmit data to the magnetic tape unit.

The tape unit 22 additionally includes a read control 457 which receives the information from read-head 458 after it is written by write-head 456 and has travelled the distance to read-head 458. The read control 457 in the above-identified tape drive unit 7970E includes a PE READ PREAMP AND DECODER and a MASTER PE READ CONTROL which are operative to produce a READ CLOCK signal (RC) on line 466 at the time when the first byte of data after the preamble is first read from the magnetic tape by read-head 458. The data accept signal (DA) on line 464 and the read clock signal (RC) on line 466 are input to the tape speed monitor 439. The time duration between the data accept signal (DA) on line 464 and the read clock signal (RC) on line 466 is a measure of the tape speed since it measures the time duration for the tape 460 to travel the fixed distance between write-head 456 and read-head 458. If the elapsed time between these two signals (DA and RC) is not within a predetermined range, the tape speed monitor 439 generates an alarm on line 433 input to the control network 440.

The tape unit control 438, the tape speed monitor 439 and the control network 440 are all part of the output and control unit data path A circuitry of the above-identified application entitled MESSAGE METERING SYSTEM.

In FIG. 1, the data available signals on lines 453 and 453' are input to the tape unit controls 438 and 438', respectively, associated with data path A and data path B, respectively. Depending on the active or inactive states of the enable lines 490 and 490', either control 438 or control 438' is rendered active, respectively.

Tape Speed Monitor (FIG. 2)

In FIG. 2, the data accept signal (DA) on line 464 is input to a conventional single-shot 472. Similarly, the read clock signal (RC) on line 466 is input to a conventional D-type flip-flop 474. The tape speed monitor 439 operates to time the duration between the signals on lines 464 and 466 and provides an alarm output on the line 433 if the time duration is not within a specified range. The timing signal for the monitor 439 of FIG. 2 is a 98.4KHz rectangular wave on line 470. The timing signal on line 470 may be derived from an oscillator in the above-referenced application REDUNDANT DATA TRANSMISSION SYSTEM, or alternatively, may be derived from any conventional source such as a crystal oscillator. The timing signal is input to a NAND gate 476 which in turn has its output connected to a conventional divide-by-$2^{10}$ counter 477. Counter 477 includes the 10 binary output stages, 0, 1, 2, . . . 9.

The tape speed monitor 439 receives the write preamble signal (WR PR) on line 465 as an input to the preset input P of flip-flop 474. Flip-flop 474 sets its output according to the level of the D input when a positive going pulse is received on its clock input CP. The clock input of flip-flop 474 is derived from the read clock line 466. Flip-flop 474 has its clear input C connected to the data path enabling line 490 as derived through an inverter 471 from the control network 440 of FIG. 1. Flip-flop 474 has its Q output connected as a clear input to counter 477 and to flip-flop 473. Flip-flop 474 has its $\overline{Q}$ outputs connected to a NOR gate 475. Gate 475 received as its other input the read clock signal on line 466. Gate 475 has its output connected to the NAND gate 479 which functions when enabled as a decoder for decoding a predetermined minimum count in counter 477. In a particular embodiment, decoder 479 receives the bit 9 output of counter 477 through an inverter 478. A 0 in the bit 9 output represents a count of less than 512 in counter 477. The output of gate 479 is input to a NAND gate 482 which in turn provides the alarm signal on output line 433.

The data accept signal (DA) on line 464 connects to a conventional single-shot 472 which has its Q input connected as the clock input CP to a conventional D-type flip-flop 473. Flip-flop 473 has its D input set to a 1 and its clear input C set by the Q output of flip-flop 474. The Q output of flip-flop 473 is input to the NAND gate 476 along with the timing signal on line 470. When enabled by the Q output of flip-flop 473, gate 476 inputs the positive-going timing pulses from line 470 to the counter 477.

NAND gate 480 receives the bit 5, 7 and 9 outputs from counter 477 and is a decoder for decoding a predetermined maximum count in counter 477. When counter 477 has 1's in bits 5, 7 and 9, it represents a count of 672. The output from gate 480 is connected through gate 482 to the alarm output line 433.

OPERATION

Figure 3:
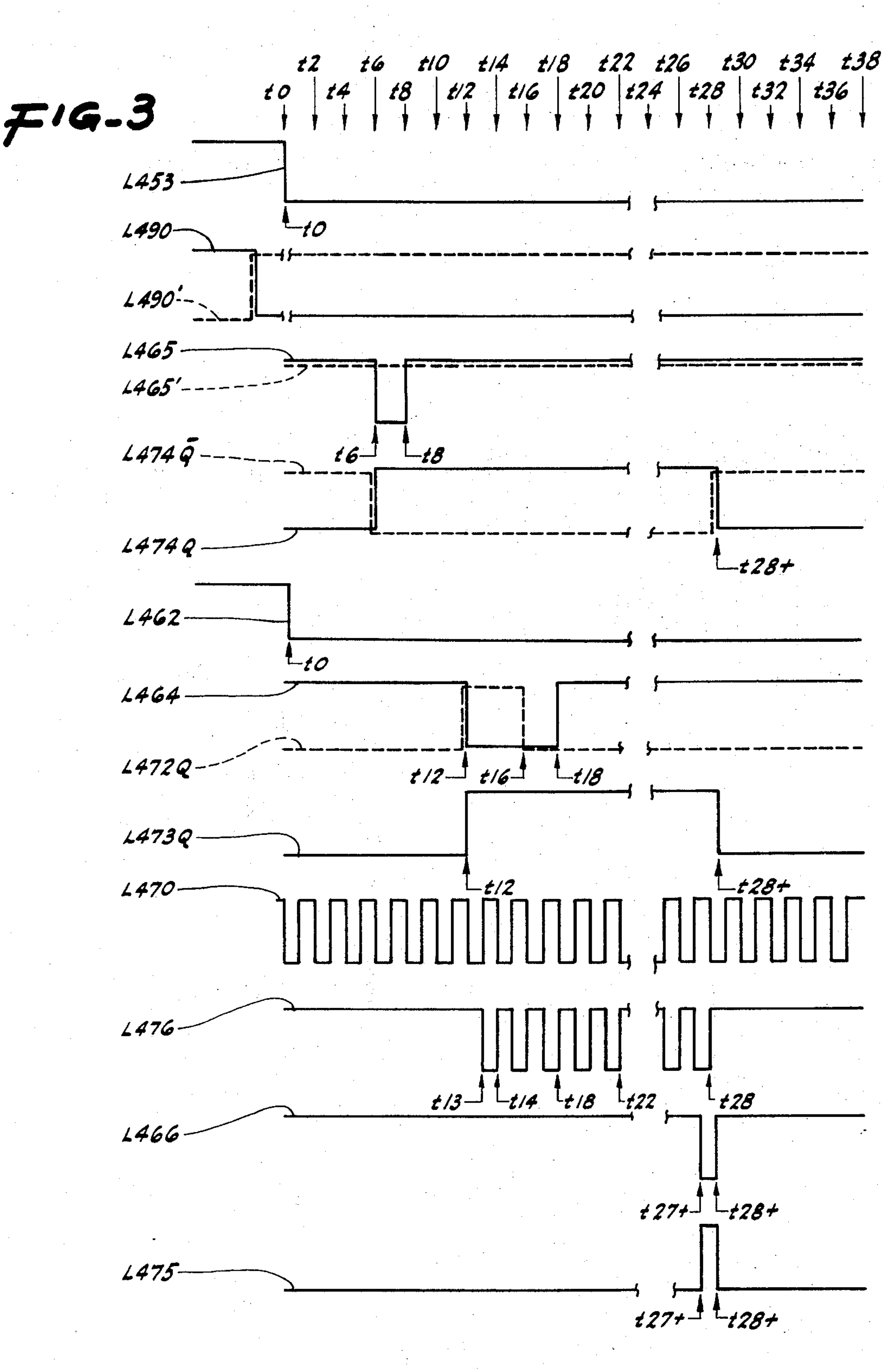
FIG. 3 depicts a schematic representation of waveforms descriptive of the operation of the tape speed monitor of FIG. 2 and the system of FIG. 1.

The operation of the tape speed monitor is described in connection with the waveforms of FIG. 3. In FIG. 3, the waveforms are designated with the letter L followed by a number which corresponds to the line or output within FIGS. 1 and 2 where the corresponding signal appears. For example, the DATA AVAIL signal on line 453 of FIG. 1 appears as waveform L453 in FIG. 3. The data available signal is typically generated by an output and control unit 14 (not shown) whenever a buffer memory 162 (not shown) is full as shown in the above-identified application MESSAGE METERING SYSTEM. Of course, any conventional circuitry may be employed to generate a data available signal which initiates the operation of the tape speed monitor of the present invention.

Referring to FIG. 3 at time *t*0, the data available signal of waveform L453 has a 1 to 0 transition and remains 0 until some later time. The control networks 440 and 440', at time *t*0 cause data path A, including tape unit 22, to be enabled active by the 0 level of waveform L490. Simultaneously, waveform L490' is a 1 which causes the data path B, including tape unit 21, to be inactive.

In FIG. 1, tape unit control 438 receives the data available signal of waveform L453 and sometime later when the tape is up to speed produces a write preamble signal as shown in waveform L465 by a negative going output at time *t*6 which returns positive at *t*8. The waveform L465 may be produced by a delay circuit and a single-shot or other conventional timing devices in controller 438 in response to waveform L453. The signal of waveform L465 functions as a preset input to the tape speed monitor of FIG. 2 to signal that data is about to be written by the tape unit 22.

At the time *t*6, no corresponding transition appears in waveform L465' associated with the tape unit control 438' and data path B because no signal appears on line 453' and also because the 1 on line 47 causes data path B to be inactive.

The signal of waveform L465 operates to preset flip-flop 474 of FIG. 2 as shown after *t*6 by a 1 in waveform L474Q and a 0 in waveform L474$\overline{Q}$. With the output 474Q 1, the 0 clear signal on flip-flop 473 and on counter 477 is released. Flip-flop 474 is able to receive the preset signal of waveform L465 because the 0 of the data path enable line 490 is inverted by inverter 471 to a 1 so that no 0 clear signal is input to flip-flop 474.

Referring to FIG. 1, tape unit control 438 also provides an undelayed output in response to the data available signal of waveform L453 at *t*0. That signal is shown as waveform L462 and is a start transport signal connected to the tape unit 22. The start transport waveform L462 has a 1 to 0 transition at *t*0 which terminates at some later time. The function of waveform L462 is to initiate the movement of the magnetic tape 460 so it will achieve operating speed prior to being written upon.

The function of the waveform L465 is to initiate a write preamble signal which causes the magnetic head 456 to write a 41 byte preamble on the magnetic tape 460. When the preamble has been written, the first byte of data is written on the magnetic tape and a DATA ACCEPT signal is generated on line 464 at *t*12 by the write control 455. The DATA ACCEPT signal is a standard signal provided by the above-identified Hewlett-Packard tape unit when a write data operation is first performed. The signal of waveform L464 is input to the single-shot 472 of the tape speed monitor of FIG. 2. Single-shot 472 simultaneously has a 0 to 1 transition on its output shown by waveform 472Q which remains a 1 for a timed duration for example, from *t*12 to *t*16.

The positive-going output of waveform 472Q causes flip-flop 473 to store the 1 at its D input so that the output 473Q also has a 0 to 1 transition at *t*12. The 1 output on 473Q enables the NAND gate 476 at *t*12 so that timing pulse inputs on line 470 are enabled. In waveform L470, each 1 input forces the output of gate 476 to a 0. The first 1 input of waveform L470 occurs between *t*13 and *t*14 so that the waveform L476 output from NAND gate 476 occurs as a 0 between *t*13 and *t*14. Similarly, each 1 of the waveform L470 results in a corresponding 0 in waveform L476. Each positive going transition of the waveform L476 is a counting pulse which is counted by the counter 477. Positive going transitions occur in waveform L476 at *t*14, *t*16, *t*18, *t*20 and *t*22. A break in all of the waveforms of FIG. 3 at about *t*24 indicates that an unspecified number of counting pulses are input to counter 477. The number of input counts to the counter 477 is dependent on the length of time that it takes the magnetic tape 460 to travel between write-head 456 and read-head 458 in FIG. 1.

When the information written by write-head 456 at *t*12 time passes to read-head 458, a signal is generated at read-head 458 which is sensed by the read control 457. Control 457 produces an output READ CLOCK signal (RC) on line 466 which is input to the tape speed monitor of FIG. 2. In FIG. 3, the READ CLOCK signal of waveform L466 is arbitrarily shown to have a negative-going transition at time *t*24+ which permits the positive-going transitions in waveform L476 at t26 and *t*28 to be input to counter 477. The total number of pulse inputs to counter 477 between *t*12 and *t*28 depends on the speed of the tape 460 and the time duration elapsed in traveling between the magnetic heads 456 and 458.

In FIG. 3, read clock waveform L466 at time *t*28+ causes flip-flop 474 as shown by waveform L474Q to go from 1 to 0. That 1 to 0 transition causes a 0 input to clear flip-flop 473 and causes counter 477 to be cleared to all 0's. With flip-flop 473 cleared, its output shown by the 0 in waveform L473Q causes NAND gate 476 to have its output forced to a 1 thereby inhibiting any further inputs to counter 477 after *t*28+.

The NOR gate 475 is enabled with the 0 input of waveform L474$\overline{Q}$ during the period from *t*6 until *t*28+. At *t*28+, flip-flop 474 has its output 474$\overline{Q}$ set to 1. That 1 is input to NOR gate 475 so that after *t*28+ waveform L475 is forced to a 0. During the period between *t*6 and *t*28+, however, a 0 input on read clock line 466 to NOR gate 475 will force waveform L475 to a 1 thereby enabling NAND gate 479.

Waveform L466 is 0 between *t*27+ and *t*28+ and hence forces the output of NOR gate 475 to a 1 between *t*27+ and *t*28+ enabling NAND gate 479 between *t*27+ and *t*28+.

High Speed Alarm

With counter 477 receiving counting pulses as described above, the output from bit 9 is inverted in inverter 478 and input to the NAND gate 479 for testing the high speed end of the range of speeds for the magnetic tape 460 of tape unit 22. If during the enable period between *t*27+ and *t*28+ of waveform L475, the bit 9 output of counter 477 has not reached a 1, then the tape speed of the tape unit 22 is too fast. The predetermined maximum speed is indicated by a 0 output from bit 9 which is inverted to a 1 in inverter 478 which together with the enabling 1 from gate 475 satisfies the NAND gate 479 forcing its output to a 0. The 0 output from gate 479 forces the output of NAND gate 482 to a 1 thereby signifying a high speed alarm on output line 433. If at the time that gate 475 enables NAND gate 479 between *t*27+ and *t*28+ counter 477 has counted a 1 into bit 9, that 1 is inverted in inverter 478 to a 0 and the 0 input to NAND gate 479 forces its output to a 1. A 1 input to NAND gate 482 does not force a 1 output on line 433 and hence, no alarm under these conditions is caused by the gate 479 output.

The $2^9$ count in the counter 477 signifies a division by 512. With an input frequency on line 466 of 98.4KHz, and with a division of 512, the absence of a 1 in bit 9 signifies that less than 5.12 milliseconds have passed. If the magnetic tape has travelled from the write-head 456 to the read-head 458 in less than 5.12 milliseconds, its speed is too fast for reliable recording. The period of 5.12 milliseconds represents a speed of more than 29 inches per second.

Low Speed Alarm

In FIG. 2, the NAND gate 480 serves to detect a 1 in the 5, 7 and 9 bits of counter 477. If all of the other bits in counter 477 are 0's, that count represents a count of 672. If other bits include 1's, the count is greater than 672. If at any time during the counting process the bits 5, 7 and 9 are energized with 1's, gate 480 is satisfied and its output goes to 0. That output 0 from NAND gate 480 forces NAND gate 482 to have a 1 output which causes a slow speed alarm input to the control networks 440. If counter 477 has not reached a count including 1's in bits 5, 7 and 9 by the read clock signal at time *t*28+, the counter is reset to all 0's by the operation of flip-flop 474 so that the low speed alarm never occurs. A count of 672 in counter 477 represents a period of 6.8 milliseconds. If the tape in tape unit 22 has not travelled from write-head 456 to read-head 458 in a period of 6.8 milliseconds, it is travelling too slow for reliable recording. The period of 6.8 milliseconds represents a speed of less than 22.1 inches per second.

While the invention has been particularly shown and described with reference to preferred embodiments thereof it will be understood by those skilled in the art that various changes in form and details may be made therein without departing from the spirit and the scope of the invention.

What is claimed is:

1. In a magnetic tape recording unit having write apparatus including a write-head for writing information on a magnetic tape, having read apparatus including a read-head for reading information from the magnetic tape, and having transport means for transporting the magnetic tape from the write-head toward the read-head at speeds which may vary, a tape speed monitor comprising, a counter for counting timing pulses, starting circuit means for starting the count in said counter when data is written on the magnetic tape, output means, responsive to a predetermined count in said counter when said data is read from the magnetic tape, for generating an alarm signal signifying a tape speed error.

2. The tape speed monitor of claim 1 wherein said output means includes a decoder, enabled by the reading of said data from the magnetic tape, responsive to a predetermined count in said counter for indicating that the tape speed is above a predetermined limit.

3. The tape speed monitor of claim 1 further including stopping circuit means for stopping the counting of said counter when said data is read from the magnetic tape and further including a decoder responsive to a predetermined count in said counter for signifying that the tape speed is below a predetermined limit.

4. The tape speed monitor of claim 1 further including stopping circuit means for stopping the counting of said counter when said data is read from the magnetic tape and wherein said output means further includes a first decoder, enabled by the reading of said data from said magnetic tape, responsive to a first predetermined count in said counter for indicating that the tape speed is above a predetermined first limit, and further includes a second decoder responsive to a second predetermined count in said counter for signifying that the tape speed is below a predetermined second limit.

5. A magnetic tape speed monitor for use with a magnetic tape unit which has a write-head and write control apparatus which signals with a signal DA when data is first written on a magnetic tape, has a read-head and read apparatus which signals with a signal RC when said data is first read from the magnetic tape and has tape transport apparatus which transports the magnetic tape in the direction from the write-head toward the read-head at speeds which may vary, said tape speed monitor comprising, a source of timing pulses, a digital counter for counting the timing pulses, starting circuit means for starting the counter counting said timing pulses in response to the DA signal, stopping circuit means for stopping said counter from counting in response to the RC signal, and output means responsive to a predetermined count in said counter for generating an alarm signal signifying that the tape speed varies from a predetermined limit.

6. The tape speed monitor of claim 5 wherein said output means includes a decoder, enabled by the RC signal, responsive to a predetermined count in said counter for indicating that the tape speed exceeds a predetermined limit.

7. The tape speed monitor of claim 5 wherein said output means includes means responsive to a predetermined count in said counter for signifying when said tape speed is below a predetermined limit.

8. The tape speed monitor of claim 5 wherein said output means further includes a first decoder responsive to a predetermined first count in said counter when enabled by said signal RC for indicating that the tape speed exceeds a predetermined first limit and a second decoder responsive to a predetermined second count, greater than said first count, in said counter for indicating that the tape speed is below a predetermined second limit, less than said first limit.

9. In a system having first and second magnetic tape units, each including write apparatus for writing information on a magnetic tape, read apparatus for reading information from the magnetic tape, and transport means for transporting the magnetic tape in the direction from the write apparatus toward the read apparatus, a control system comprising, first and second tape speed monitors associated with said first and second tape units, respectively, for generating first and second alarm signals, respectively, each tape speed monitor including a counter for counting timing pulses, including starting circuit means for initiating counting in said counter when data is first written in the associated magnetic tape unit, including output means responsive to a predetermined count in said counter when said data is read for generating the alarm signal signifying a tape speed error in the associated tape unit, first and second control networks for enabling the first and second tape units, respectively, and enabling the first and second tape speed monitors, respectively, said first and second control networks responsive to said second and first alarm signals, respectively, for enabling a tape unit and tape speed monitor which is not producing an alarm signal.

10. The control system of claim 9 wherein said output means for each of said tape speed monitors includes a decoder responsive to a predetermined count in said counter when enabled by the reading of said data for indicating that the tape speed is above a predetermined limit.

11. The control system of claim 9 wherein each of said tape speed monitors further includes stopping circuit means for stopping the count of said counter when said data is read from the magnetic tape and wherein the output means for each of said tape speed monitors further includes a decoder responsive to a predetermined count in said counter for signifying that the tape speed is below a predetermined limit.

12. The control system of claim 9 wherein each of said tape speed monitors further includes stopping circuit means for stopping the count of said counter when said data is read from the magnetic tape and wherein said output means for each of said tape speed monitors further includes a first decoder responsive to a predetermined first count in said counter when enabled by the reading of said data for indicating that the tape speed is above a predetermined first limit, and further includes a second decoder responsive to a predetermined second count in said counter signifying that the tape speed is below a predetermined second limit.

13. A magnetic tape speed monitor for monitoring the speed of magnetic tape comprising, a source of timing pulses, a digital counter for counting said timing pulses, starting circuit means for starting said counter counting said timing pulses when data is first written on the magnetic tape, stopping circuit means for stopping said counter from counting when said data is first read from the magnetic tape, and output means responsive to a predetermined count in said counter for generating an alarm signal signifying a tape speed error.

14. The tape speed monitor of claim 13 wherein said output means includes a decoder enabled by the first reading of said data, said decoder responsive to a predetermined count in said counter for indicating that the tape speed exceeds a predetermined limit.

15. The tape speed monitor of claim 13 wherein said output means includes a decoder responsive to a predetermined count in said counter for signifying when the tape speed is below a predetermined limit.

16. A magnetic tape speed monitor for use with a magnetic tape recording unit which has a write-head and write control apparatus for signaling with a signal DA when data is first written on a magnetic tape, has a read-head and read apparatus for signaling with a signal RC when said data is first read from the magnetic tape, and has a tape transport for transporting the magnetic tape in a direction from the write-head toward the read-head at speeds which may vary, said tape speed monitor comprising, a source of rectangular wave timing pulses, a binary digital counter for counting said timing pulses, said counter including means for being cleared and means providing parallel outputs representing predetermined digital counts stored by said counter, starting circuit means including a first flip-flop latched in response to said signal DA and including a gate which is enabled by said first flip-flop when latched to pass said timing pulses to said counter, stopping circuit means, including a second flip-flop latched in response to said signal RC, said second flip-flop operative to clear said first flip-flop and disable said gate so as to inhibit further timing pulses input to said counter and to clear said counter, a first decoder operative to receive a first output from said counter for detecting a first predetermined count when enabled by said signal RC to signal that the tape speed exceeds a predetermined first limit, a second decoder connected to receive a second output from said counter for detecting a second predetermined count, if said counter is not first cleared by the operation of said second flip-flop, to signal that the tape speed is below a predetermined second limit, logical combining means for combining the outputs of said first and second decoders to signal an alarm whenever said tape speed is outside a range defined by said predetermined first and second limits.

* * * * *